(12) United States Patent
Angius et al.

(10) Patent No.: US 12,204,559 B2
(45) Date of Patent: Jan. 21, 2025

(54) DATABASE TRANSACTIONS ACROSS DIFFERENT DOMAINS

(71) Applicant: Snowflake Inc., Bozeman, MT (US)

(72) Inventors: Fabio Angius, El Sobrante, CA (US); Krishna B. Nibhanupudi, Shoreline, WA (US); Zechao Shang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 4 days.

(21) Appl. No.: 18/051,148

(22) Filed: Oct. 31, 2022

(65) Prior Publication Data

US 2023/0385305 A1    Nov. 30, 2023

Related U.S. Application Data

(63) Continuation of application No. 17/810,990, filed on Jul. 6, 2022, now Pat. No. 11,514,080.

(60) Provisional application No. 63/365,580, filed on May 31, 2022.

(51) Int. Cl.
| | |
|---|---|
| *G06F 16/00* | (2019.01) |
| *G06F 16/182* | (2019.01) |
| *G06F 16/23* | (2019.01) |
| *G06F 16/28* | (2019.01) |

(52) U.S. Cl.
CPC .......... *G06F 16/283* (2019.01); *G06F 16/182* (2019.01); *G06F 16/23* (2019.01)

(58) Field of Classification Search
None
See application file for complete search history.

(56) References Cited

U.S. PATENT DOCUMENTS

| | | |
|---|---|---|
| 5,335,343 A | 8/1994 | Lampson et al. |
| 9,015,136 B2 * | 4/2015 | Toews ................... G06F 16/972 |
| | | 709/227 |
| 9,904,722 B1 | 2/2018 | Shevade et al. |
| 10,078,562 B2 | 9/2018 | Subbarayalu et al. |
| 10,275,400 B1 | 4/2019 | Newman |
| 10,296,371 B2 | 5/2019 | Guerin et al. |
| 10,684,966 B1 | 6/2020 | Hamman et al. |

(Continued)

OTHER PUBLICATIONS

"U.S. Appl. No. 17/810,990, Notice of Allowance mailed Aug. 31, 2022", 12 pgs.

(Continued)

*Primary Examiner* — Polina G Peach
(74) *Attorney, Agent, or Firm* — Schwegman Lundberg & Woessner, P.A.

(57) ABSTRACT

The subject technology sends a first statement to an execution node for executing the first statement on first storage using micro-partitions. The subject technology sends a second statement to the execution node for executing the second statement on linearizable storage. The subject technology sends a request to prepare a commit of a cross domain transaction associated with the first statement and the second statement. The subject technology generates a new version of a set of tables that were modified by the cross domain transaction and updating first metadata in a metadata database to indicate the new version. The subject technology finalizes the commit of the cross domain transaction and updates second metadata that the cross domain transaction has been committed.

27 Claims, 10 Drawing Sheets

(56) References Cited

U.S. PATENT DOCUMENTS

| | | |
|---|---|---|
| 10,970,311 B2 | 4/2021 | Horii |
| 10,983,981 B1* | 4/2021 | Sharma ............... G06F 16/2365 |
| 11,269,918 B2 | 3/2022 | Douros et al. |
| 11,314,700 B1 | 4/2022 | Yavno et al. |
| 11,514,080 B1 | 11/2022 | Angius et al. |
| 2002/0103814 A1* | 8/2002 | Duvillier ................. G06F 16/24 |
| 2003/0105755 A1* | 6/2003 | Daynes .................... G06F 9/52 |
| 2003/0126114 A1 | 7/2003 | Tedesco et al. |
| 2004/0030703 A1* | 2/2004 | Bourbonnais ....... G06F 16/2379 |
| 2005/0033720 A1* | 2/2005 | Verma .................... G06F 9/466 |
| 2006/0136376 A1* | 6/2006 | Jain .................... G06F 16/1774 |
| 2008/0140663 A1* | 6/2008 | Jones ................. G06F 16/1774 |
| 2013/0132349 A1* | 5/2013 | Hahn ...................... G06F 16/20 707/649 |
| 2014/0074882 A1 | 3/2014 | Vyvyan |
| 2014/0095452 A1* | 4/2014 | Lee ......................... G06F 3/065 707/683 |
| 2014/0236913 A1 | 8/2014 | Chakradhar et al. |
| 2014/0330767 A1* | 11/2014 | Fowler .................. G06F 16/288 707/607 |
| 2014/0365433 A1* | 12/2014 | Hong ................. G06F 16/2379 707/611 |
| 2015/0006466 A1 | 1/2015 | Tonder et al. |
| 2015/0046413 A1* | 2/2015 | Andrei ............... G06F 11/1448 707/695 |
| 2015/0088811 A1 | 3/2015 | Hase et al. |
| 2015/0172412 A1* | 6/2015 | Escriva ................. H04L 67/10 709/202 |
| 2016/0085772 A1 | 3/2016 | Vermeulen et al. |
| 2016/0350392 A1* | 12/2016 | Rice .................... G06F 16/2282 |
| 2018/0047002 A1 | 2/2018 | Vermeulen et al. |
| 2018/0150360 A1* | 5/2018 | Kwon ................ G06F 16/2365 |
| 2018/0189373 A1 | 7/2018 | Shevade et al. |
| 2018/0322156 A1 | 11/2018 | Lee et al. |
| 2019/0171763 A1 | 6/2019 | Cai et al. |
| 2019/0197173 A1* | 6/2019 | Tahara .................... G06F 3/065 |
| 2019/0207929 A1* | 7/2019 | Koorapati ............ G06F 3/0619 |
| 2019/0235933 A1 | 8/2019 | Levandoski et al. |
| 2019/0251198 A1 | 8/2019 | Shamsutdinov |
| 2020/0012659 A1* | 1/2020 | Dageville ............ G06F 16/245 |
| 2020/0175000 A1 | 6/2020 | Borrill |
| 2020/0320200 A1* | 10/2020 | Singh ........................ G06F 8/65 |
| 2022/0188332 A1* | 6/2022 | Weaver ............... G06F 16/2358 |
| 2022/0253363 A1* | 8/2022 | Zhang .................. G06F 16/273 |
| 2022/0382650 A1* | 12/2022 | Schreter ............. G06F 11/2094 |
| 2022/0382734 A1* | 12/2022 | Wang .................. G06F 16/2379 |
| 2022/0405249 A1* | 12/2022 | Cseri .................. G06F 16/1824 |
| 2023/0118947 A1* | 4/2023 | Yelin .................. G06F 16/2343 707/690 |
| 2024/0104116 A1* | 3/2024 | Katsipoulakis ....... G06F 16/283 |

OTHER PUBLICATIONS

Kim, Kangnyeon, et al., "BionicDB: Fast and Power-Efficient OLTP on FPGA", EDBT, (2019).

* cited by examiner

DATABASE TRANSACTIONS ACROSS DIFFERENT DOMAINS

CROSS-REFERENCE TO RELATED APPLICATIONS

This application is a continuation of U.S. Non-Provisional patent application Ser. No. 17/810,990, filed on Jul. 6, 2022, entitled "CROSS DOMAIN TRANSACTIONS," which claims priority to U.S. Provisional Patent Application Ser. No. 63/365,580, filed May 31, 2022, entitled "CROSS DOMAIN TRANSACTIONS," and the contents of each are incorporated herein by reference in their entirety for all purposes.

TECHNICAL FIELD

Embodiments of the disclosure relate generally to a network-based database system or a cloud data platform and, more specifically, to processing concurrent transactions to enable transactional processing across different domains in a safe and performant manner (e.g., avoiding deadlock and starvation) within the database system.

BACKGROUND

Cloud-based data warehouses and other database systems or data platforms sometimes provide support for transactional processing that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
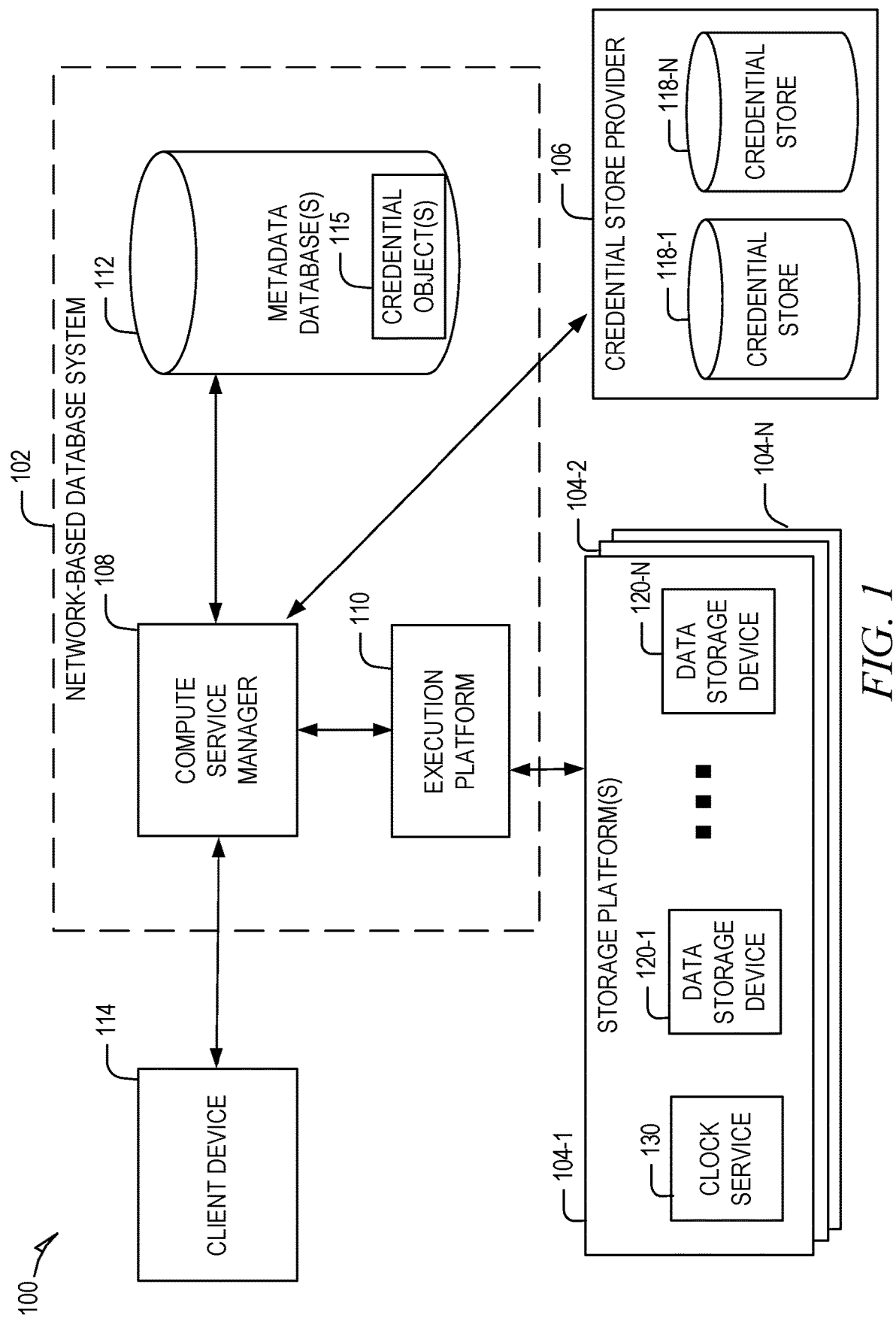
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control for read operations (MVCC) and locking for write operations. Additionally, the subject technology implements a targeted isolation level (e.g., snapshot isolation), where each statement can execute against a different snapshot of a database, and write locks are held until a transaction commit.

The subject technology, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding. Upon transaction commit, write operations can become visible, and write locks held by each contained statement can be released.

Moreover, embodiments of the subject technology facilitate transactions across a distributed database (e.g., FoundationDB) and a second database of a different type. More specifically, embodiments described herein provide transactional consistency across separate storage platforms or separate storage devices that do not share the same transaction paradigm or the same storage format. In an example, a first storage platform or storage device uses file level, pessimistic locking and records changes as a file set constituting a table, and a second storage platform or second storage device uses record level locking and records changes using Multi Version Concurrency Control (MVCC).

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104-1).

The compute service manager 108 is further coupled to the execution platform 110, which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with storage platform 104-1.

In an embodiment, each storage platform can provide a different domain or type of storage. For example, storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

As further shown, the storage platform 104-1 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104-1, are shown in FIG. 1 as individual discrete components. However, each of the compute service manager 108, metadata database(s) 112, execution platform 110, and storage platform 104-1 may be implemented as a distributed system (e.g., distributed across multiple systems/platforms at multiple geographic locations). Additionally, each of the compute service manager 108, metadata database(s) 112, execution platform 110, and storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
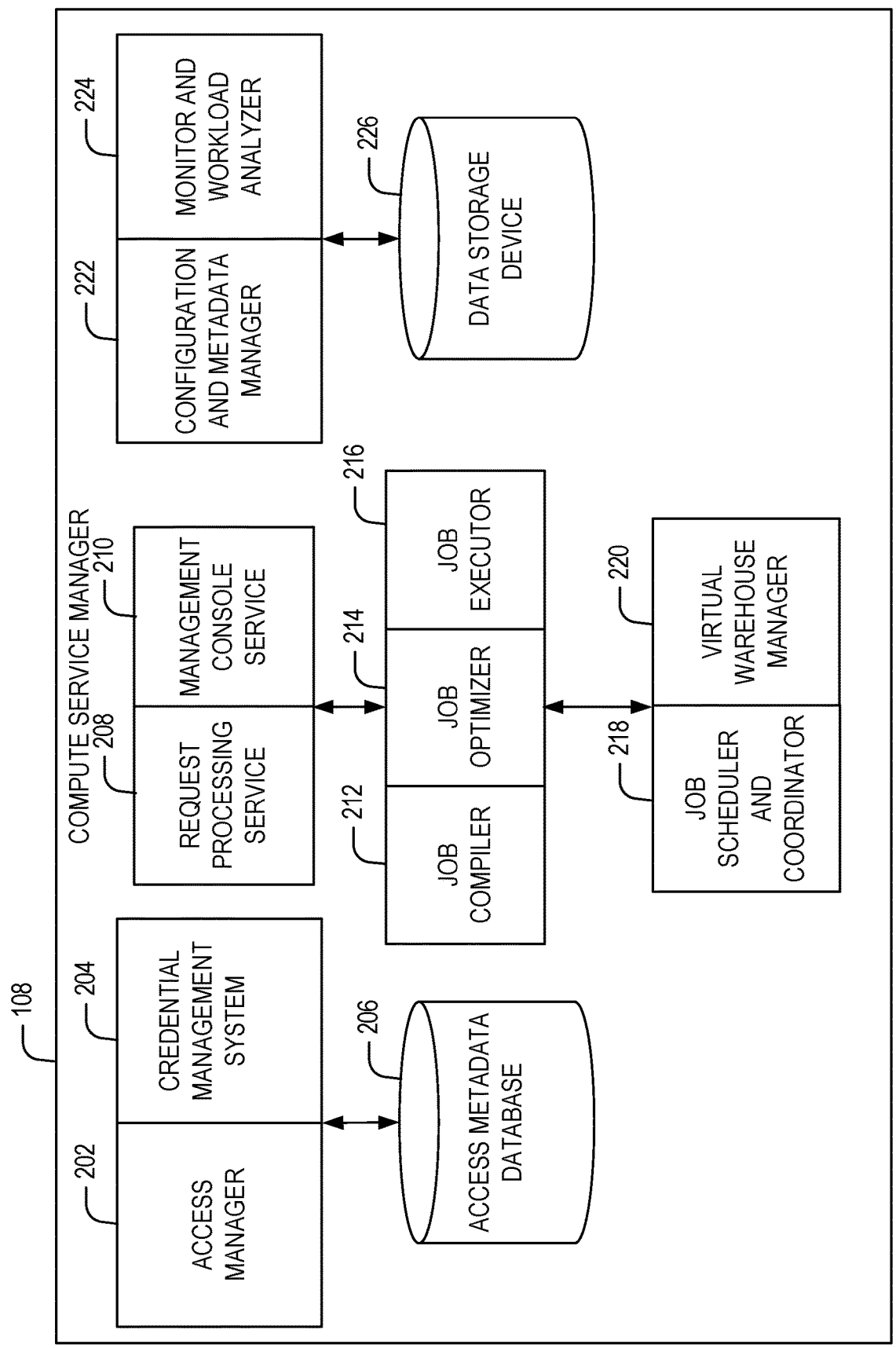
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104-1.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104-1) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104-1, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
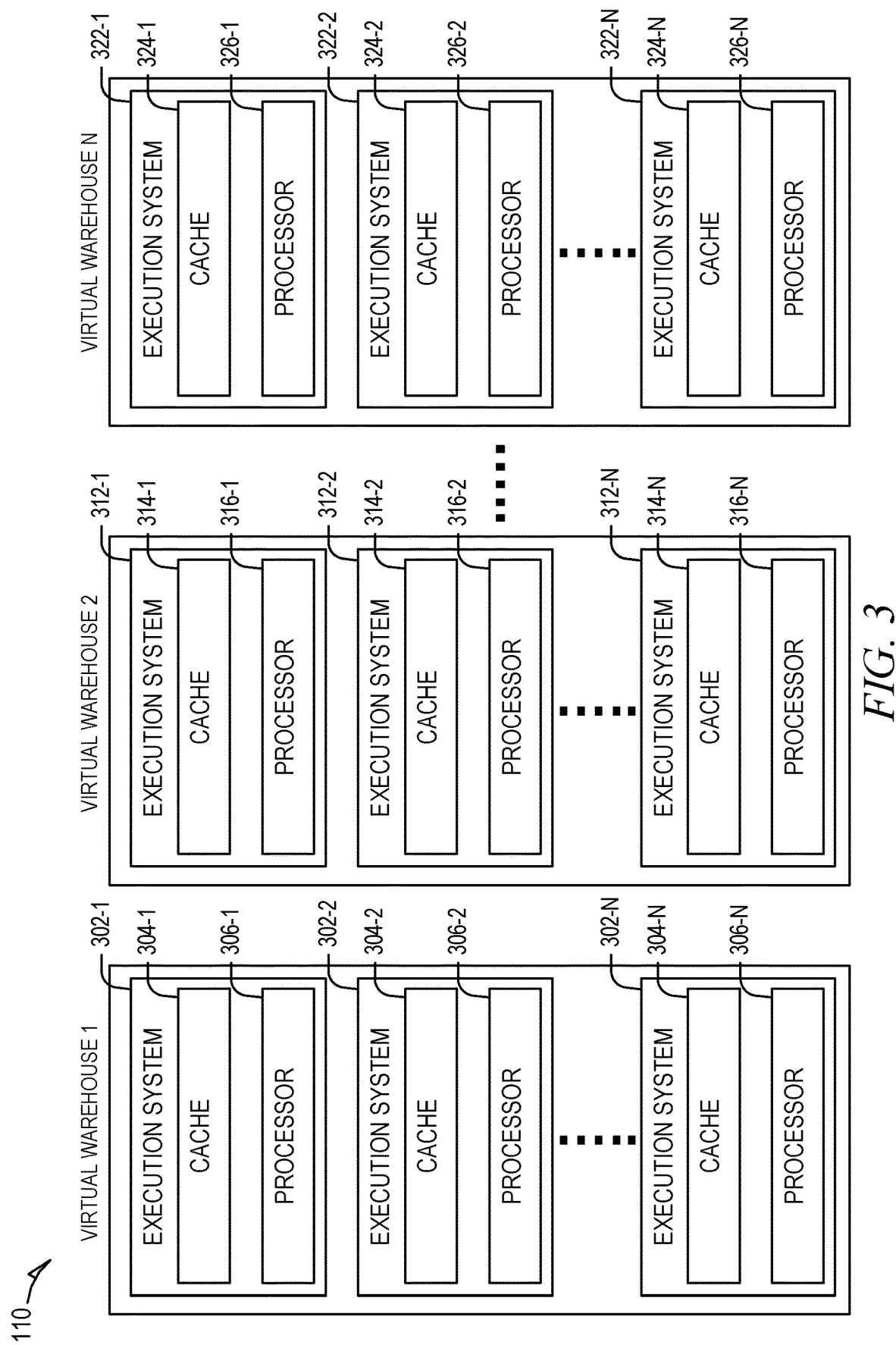
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104-1).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104-1. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
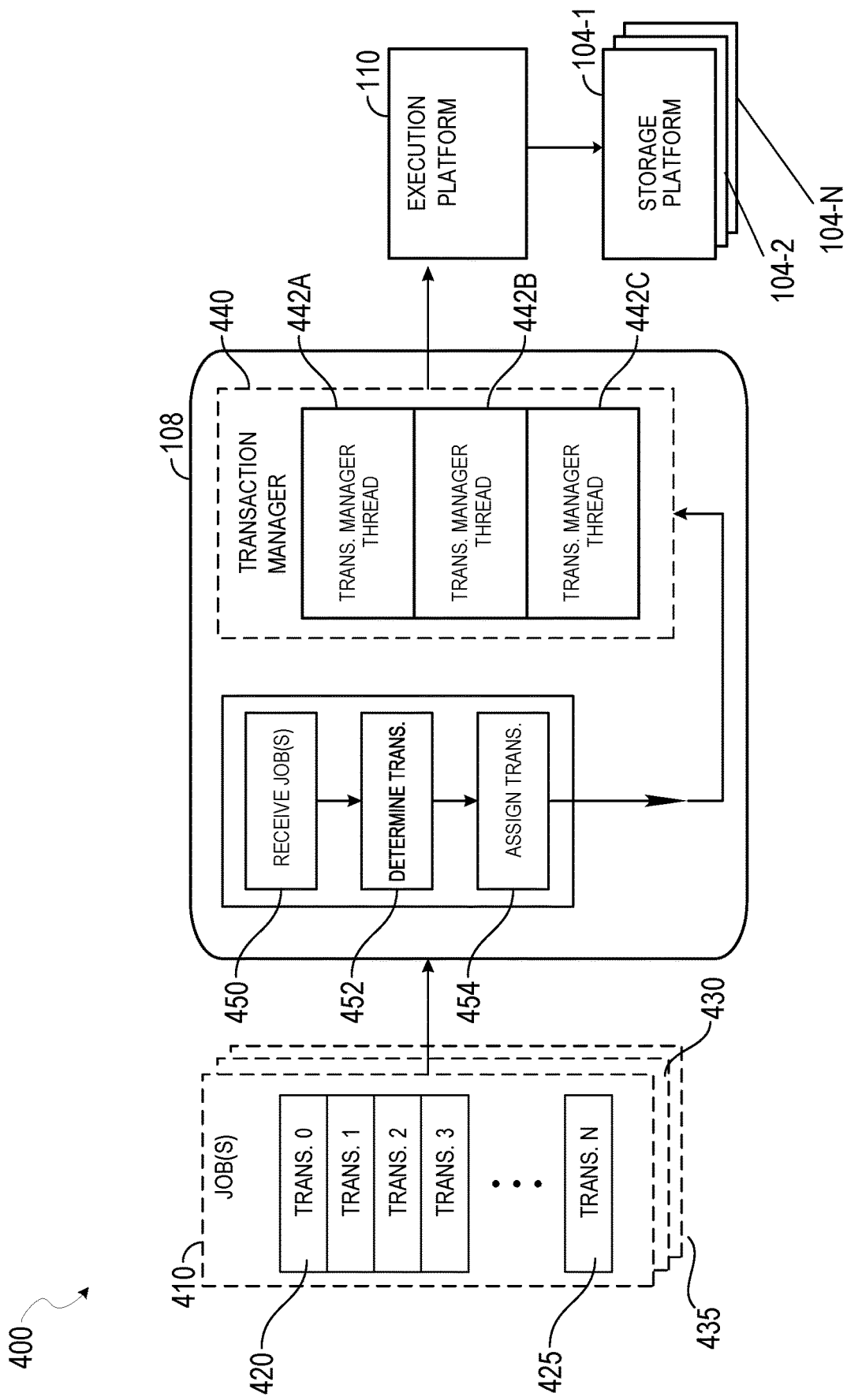
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104-1, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g. for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The subject technology provides concurrency control and isolation for executing transactions against (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104-1, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104-1), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104-1, such as FoundationDB, that can be leveraged to enable a more efficient transaction implementation. For example, in a write(/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1
S1 starts a FoundationDB Transaction, and uses its Read Version as the Read Timestamp
S1 wishes to write object X, so it first reads object X as of the Read Timestamp
Finding no conflicts, S1 writes X, using a timestamped operation to embed the commit timestamp in the key and setting IsCommitEmbedded.
S1 sets a read conflict range on the FoundationDB transaction for all keys with a prefix of X
S1 writes a transaction status entry for ID, directly setting it to committed.
T1 commits the FoundationDB Transaction.
If the transaction commits, then there were no concurrent conflicting transactions.
If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104-1, or within memory or cache of the execution platform 110.

The following discussion relates to a read protocol that is utilized by the transaction manager 440 for read operations to linearizable storage.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440 for write operations to linearizable storage.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104-1 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:

```
{
    S1 does a linearizable storage write for X.TXN2.1.0 with a value of 100
    // The next step is for S1 to check for WW (write-write) conflicts by
    checking whether there is
    // another transaction that has updated X between the RTS and S1's write.
    S1 issues the range read [X.0, X.inf] to obtain the set all versions of X and
    their stamps
    The read returns [X.TXN1.0.0, X.TXN2.1.0].
    S1 looks up TXN1 in the Transaction Status Table, finds a commit
    timestamp of 10.
    10 is earlier than our read timestamp of 15, so it is not a conflict.
    S1 ignores [X.TXN2.1.0] as it belongs to S1
    // Assume for now, there were no conflicts detected
    S1 finalizes, and records (statement number = 1, restart count = 0) into the
    transaction
    status table for TXN2
}
T2 commits. This will cause the Transaction Status Table record to be updated in
``` linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated requires two separate linearizable storage transactions:
1) The first linearizable storage transaction of T inserts a new version of the object with its key X suffixed with three-part suffix (T.ID, T.statementNumber, T.restartCount).
2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:
1) SCT is empty in which case T is trivially allowed to proceed.
2) SCT is not empty, but for all Ti in SCT, T1 has committed before T's read timestamp, and thus are not WW (write-write) conflicts. T may proceed.
3) SCT is not empty; for all Ti in SCT, T1 is committed; and there exists a Ti in SCT, such that its CTN is greater than T's read timestamp. T is permitted to restart without delay.
4) SCT is not empty, and for one or more Ti in SCT, T1 has not yet committed or aborted. T must wait for all transactions in SCT to complete before restarting the current statement.
5) SCT is not empty, and for one or more Ti in SCT, T1.TransactionID is the same as our own transaction ID, and Ti.StatementCount is less than our current statement count. This means that currently the lock is held, as a previous statement took it and successfully finished its execution. T may proceed.
6) SCT is not empty, and for one or more Ti in SCT, Ti.TransactionID is the same as our own transaction ID, Ti.StatementCount is the same as our own StatementCount, and T1.RestartCount is less than our own restart count. This is a lock from a previous execution of our own transaction, thus T holds the lock on this row, and T may proceed.

For all cases, the object (X.Stamp, Value) will be left in the database (e.g., the storage platform 104-1). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion relates to determining whether to commit, abort, or restart a given transaction to linearizable storage which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104-1) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104-1).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to cross domain transactions that may be supported by embodiments of the subject system.

As mentioned previously, in embodiments, the subject technology enables transactions across a distributed database (e.g., FoundationDB) and a second database of a different type. More specifically, embodiments described herein provide transactional consistency across separate storage platforms or separate storage devices that do not share the same transaction paradigm or the same storage format. Concurrent or separate transactions involving both separate storage platforms or storage devices in the manner are referred to herein as cross domain transactions where a first storage platform or storage device corresponds to a first domain and a second storage platform or second storage device corresponds to a second domain. In this regard, the first storage platform or storage device uses file level, pessimistic locking and records changes as a file set constituting a table, and the second storage platform or second storage device uses record level locking and records changes using Multi Version Concurrency Control (MVCC).

As discussed below, cross domain transactions can involve a first type of storage corresponding to a first type of database (e.g., database supporting transactions involving micro-partitions stored in a Flocon de Neige (FDN) format) and a second type of storage corresponding to a second type of database (e.g., distributed database supporting transactions using FoundationDB format). Different storage types are also referred to as different "storage area" or "storage areas" herein.

Some existing implementations adopt a transaction protocol such as two phase commit (2PC) and hold locks on modified data until changes are visible on both storage areas. As discussed herein, transaction manager 440 provides the following advantages and differences for such existing solutions:

- Changes become available on each storage area without synchronization
- Locks are not held for the entire length of 2PC
- Transactions that make changes to both storage areas add entries to a separate log, called VMAP, which serves the purpose of creating a shared timeline for changes made across storages
- When a query does not target both storage areas, the query does not need to acquire locks in order to read the latest committed data, even when 2PC has not been finalized
- When a query targets data across different storage areas, its execution starts speculatively reading the latest data available, but while the query runs, the subject system validates that the data being read constitute a consistent snapshot and if that is not the case the query is preemptively restarted.

In examples described herein, micro-partition tables (e.g., tables that store data in micro-partitions as mentioned before) and linearizable storage tables (e.g., tables that are stored using a linearizable storage such as FoundationDB) use two different domains for defining a read snapshot. In an implementation, the micro-partition tables use a lamport clock (e.g., a logical clock algorithm used to determine the order of events in a distributed computer system) to organize a timeline of table versions (FTV as referred to herein), where these values are kept loosely in sync with wall clock time and table versions map lamport values to a set of files and other metadata as a result of a change to a table. A table version is a mapping between a lamport clock and the set of files that are in the table. In an example, the table version can be understood as a commit stamp. By way of example, in MVCC fashion, a statement is given a start time from the lamport clock and uses it to choose a snapshot of the table, where the snapshot is the table version with an identifier (ID) less or equal to the start time.

Similarly, in an implementation, linearizable storage tables use version stamps provided by a distributed database (e.g., FoundationDB), which do not have a direct relation with real time and use the same algorithm to determine the visibility of individual records.

In an implementation, micro-partition tables are versioned by a compute service manager (e.g., compute service manager 108) and stored on a metadata database (e.g. metadata database 112). In an implementation, an execution node executes and provides functionality for linearizable storage transactions involving a distributed database and uses a storage platform (e.g., storage platform 104-1) for persistence.

In an example, transactions that perform write operations to both types of databases (e.g., database for transactions involving micro-partitions and distributed database for linearizable storage transactions) remain atomic, e.g., future transactions see the set of changes to both types of databases or, if the workload allows it, none of them. Moreover, each type of database may be provided by two different storage platforms or storage devices as discussed before in FIG. 1.

Committed changes are immediately visible in both storages hence transactions that read one storage at the time can remain agnostic of the two different data timelines.

In an implementation, the subject technology assumes the following for the discussions further herein:

1. A single DML statement always writes to one type of database (e.g., database for transactions involving micro-partitions or distributed database for linearizable storage transactions)
2. Multi-statement transactions that write to both types of databases are infrequent and cannot outperform the slowest domain that provides databases supporting transactions involving micro-partitions Embodiments of the subject technology provide a 2PC where a compute service manager prepares transactions for commit on a first type of database and subsequently on a second type of database, and finalizes the commit in the same order.

To bridge the gap between the two MVCC models, the subject technology utilizes metadata called a Version Map (VMAP), which tracks the state of cross domain transactions on a compute service manager, and extends table versions with new attributes.

New entries in VMAP are inserted each time a cross domain (CD) transaction advances in the commit process, e.g., after executing prepare or finalize.

Naming tables as T1,T2, ... Tn, and FDB versions as V1, V2 ... Vn, each VMAP entry will have either of the following formats:

<T1,Vj, PENDING> or <T1,Vj, Vk> where $V_j$ is the FoundationDB version at which the commit was prepared and $V_k$ is the version at which commit was finalized by the execution node providing access to linearizable storage, this value is set to PENDING when the commit is in the preparation phase.

In an implementation, $V_j$ is also appended as an attribute to every table version created by the transaction to inform any user of the table that a cross domain transaction has created that version.

Note that there is no need for an inverse mapping, such as $V_k$ to T1, since the lifetime of a transaction is entirely controlled by a compute service manager. Every time a statement refers to both domains, the mapping should happen from the lamport clock to the read version of the linearizable storage. If a statement refers to a linearizable storage table only, in read committed isolation we can include every committed transaction. Same holds true for statements involving micro-partition tables.

The following discussion relates to an example cross domain transaction.

Figure 5:
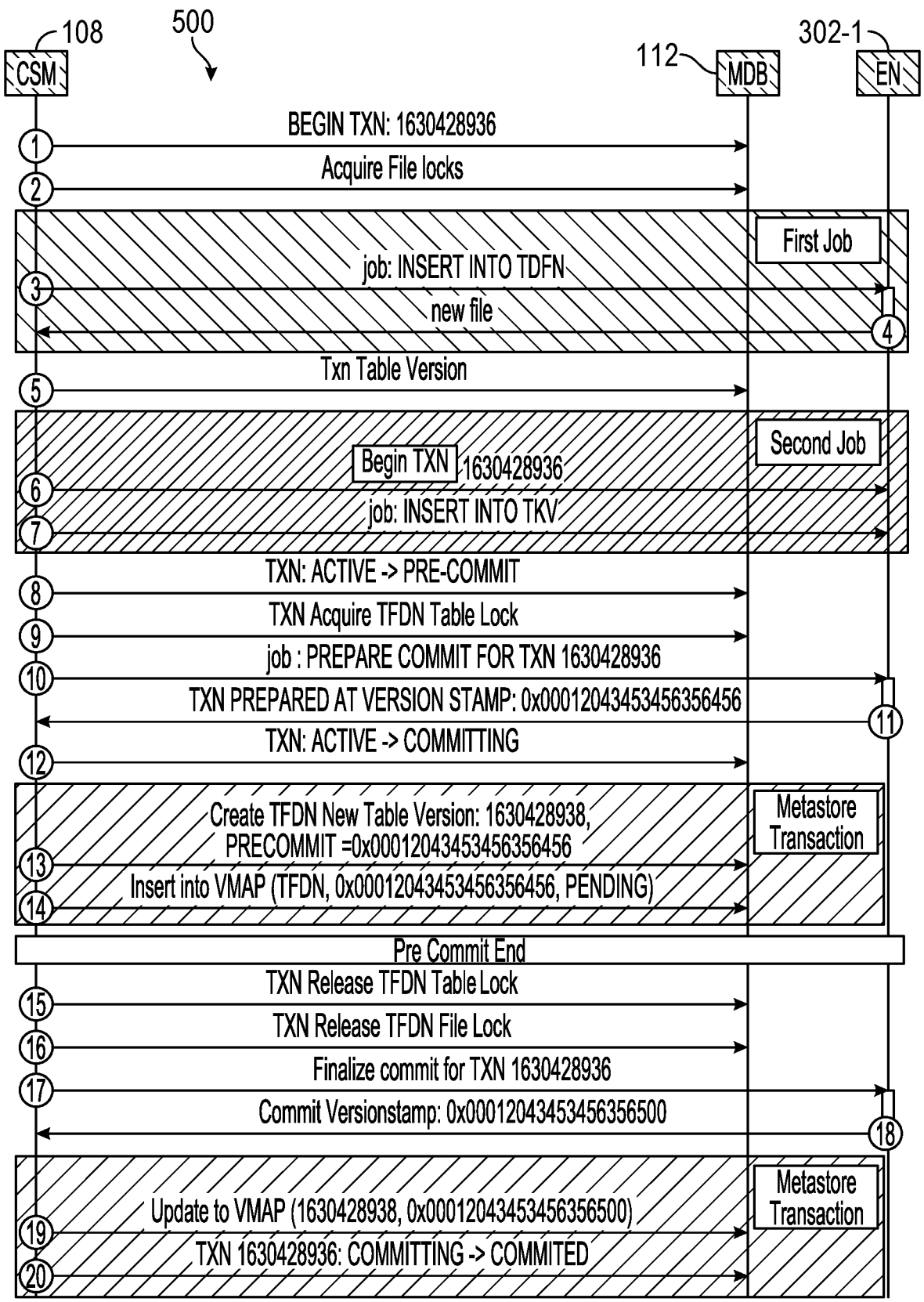
FIG. 5 illustrates an example processing flow for a set of operations of an example cross domain transaction.

FIG. 5 illustrates an example processing flow 500 for a set of operations of an example cross domain transaction. The processing flow 500, in an implementation, can be performed by the compute service manager 108, including transaction manager 440, working in conjunction with a metadata database (metadata database 112) and an execution node (e.g., execution node 302-1).

In the example of FIG. 5. the following transaction is represented in a set of operations illustrated in the processing flow:

```
BEGIN;
INSERT INTO TFDN VALUES (1,1);
INSERT INTO TKV VALUES (2,2);
COMMIT;
```

In the example of FIG. 5, multi-statement transactions are discussed as a single statement can only write to one storage type and therefore a transaction that writes both to a micro-partition table and linearizable storage table can only happen in this setting. Each operation corresponds to a point in FIG. 5. For example, the first operation in FIG. 1 corresponds to "point 1" which is shown as the first operation in FIG. 5.

At point 1, a transaction, based on a transaction ID, is initialized and bound to the session by computer service manager (e.g., compute service manager 108) sending a request to a metadata database (e.g., metadata database 112). Such a transaction includes multiple statements where at least one statement is performed in a first domain (e.g., involving a micro-partition table provided by a first type of database in a given storage platform) and at least one statement in performed in a second domain (e.g., involving a linearizable storage table provided by a second type of database in a given storage platform).

At point 2, file locks are acquired by the compute service manager 108 which is facilitated by the metadata database (e.g., metadata database 112).

At point 3, a DML, statement over a micro-partition table is processed by the compute service manager 108 and sent as a job to an execution node (e.g., execution node 302-1), and the job is executed by the execution node which in turns produces and deletes files that will be registered to the compute service manager (e.g., compute service manager 108) and EP files via a REST API in an implementation. At point 4, a new file is returned by the execution node to the compute service manager 108 in response to executing the job corresponding to the DML statement.

At point 5, the compute service manager 108 updates a table version in the metadata database 112.

Analogously, in points 6 and 7, the DML statement for a linearizable storage table is processed by the compute service manager 108, which sends a job to the execution node which leverages linearizable storage features described before to make record level changes in the datastore. In an example, the compute service manager 108 remains agnostic of these changes, and only knows about the open transaction. At point 6, it can be seen that a statement based on the same transaction ID as point 1, is initiated involving a linearizable storage table (e.g., distributed database such as FoundationDB provided by a particular storage platform discussed before).

Once a COMMIT statement is received, at point 8, compute service manager 108 starts the commit process and moves the transaction to PRE-COMMITTING state by updating the metadata database 112. In an example, micro-partition tables require an exclusive lock on the table so that FTVs can be created in a serialized manner, hence at point 9 a lock is acquired (e.g., by updating the metadata database 112) by the compute service manager 108 for every micro-partition table modified by the transaction and held until the commit is finalized.

At point 10, the compute service manager 108 sends a request to the execution node to prepare the commit on the key value table provided by linearizable storage. At point 11, the request will return to the compute service manager 108 and includes the version stamp at the time the operation ends.

At point 12, compute service manager 108 moves the transaction to COMMITTING state by updating the metadata database 112.

At point 13, the compute service manager 108 creates a new version of the modified tables at the metadata database 112. This is accomplished by copying the table version created in point 5 from the transaction to the global scope, the newly created table version will reference the version stamp obtained at point 10. A new entry (TFDN, 0x00012043453456356456, PENDING) is added to VMAP in the metadata database 112 at point 14. At this time, it is still not known what version will be used to commit the linearizable storage side of the transaction so PENDING is the state.

Note that FTVs and VMAP entries are to be written within the same transaction, and failing to do so may make the newly created versions visible ahead of time.

After the VMAP entries are written, new cross domain transactions can be aware of the pending commit and therefore the newly created table version can be visible to all other single domain transactions.

At points 15 and 16, the compute service manager 108 releases the table locks at the metadata database 112, which were acquired in point 9.

At point 17, the compute service manager 108 sends a request to finalize commit to the execution node for linearizable storage which will reply with the commit version stamp that will be used to update the pending entry in VMAP at the metadata database 112 with its commit version stamp at point 18.

At point 19, the compute service manager 108 updates the VMAP at the metadata database 112. At point 20, the compute service manager 108 updates the state of the transaction to COMMITTED on the metadata database 112.

The following discussion relates to how queries can use the VMAP to obtain a stable snapshot of the data.

A query that references only micro-partition tables can proceed safely in every circumstance.

A query that refers to micro-partition and linearizable storage tables may need to validate their own snapshot. Before running one of such queries, the compute service manager 108 chooses a FTV for every micro-partition table that will read, and if none of these FTVs includes a PRE-PARE version stamp, then the table was not modified by a cross domain transaction and the query can proceed safely.

Conversely, if one or more of the table versions contain a version stamp then the snapshot needs validation.

In an example, every FTV for table Ti has a prepare timestamp Vj, the snapshot used by linearizable storage is Vk, and the query snapshot is stable if every entry in VMAP:

(T1,Vj, Vz)

Vk>=Vz

This is because the linearizable storage read snapshot includes all data that has been modified by the cross domain transactions that operated on the micro-partition tables.

In another example, if for one or more entry Vz is PENDING, then the snapshot is not guaranteed to be stable and the query will have to wait for the pending transactions to be committed before results can be validated.

Figure 6:
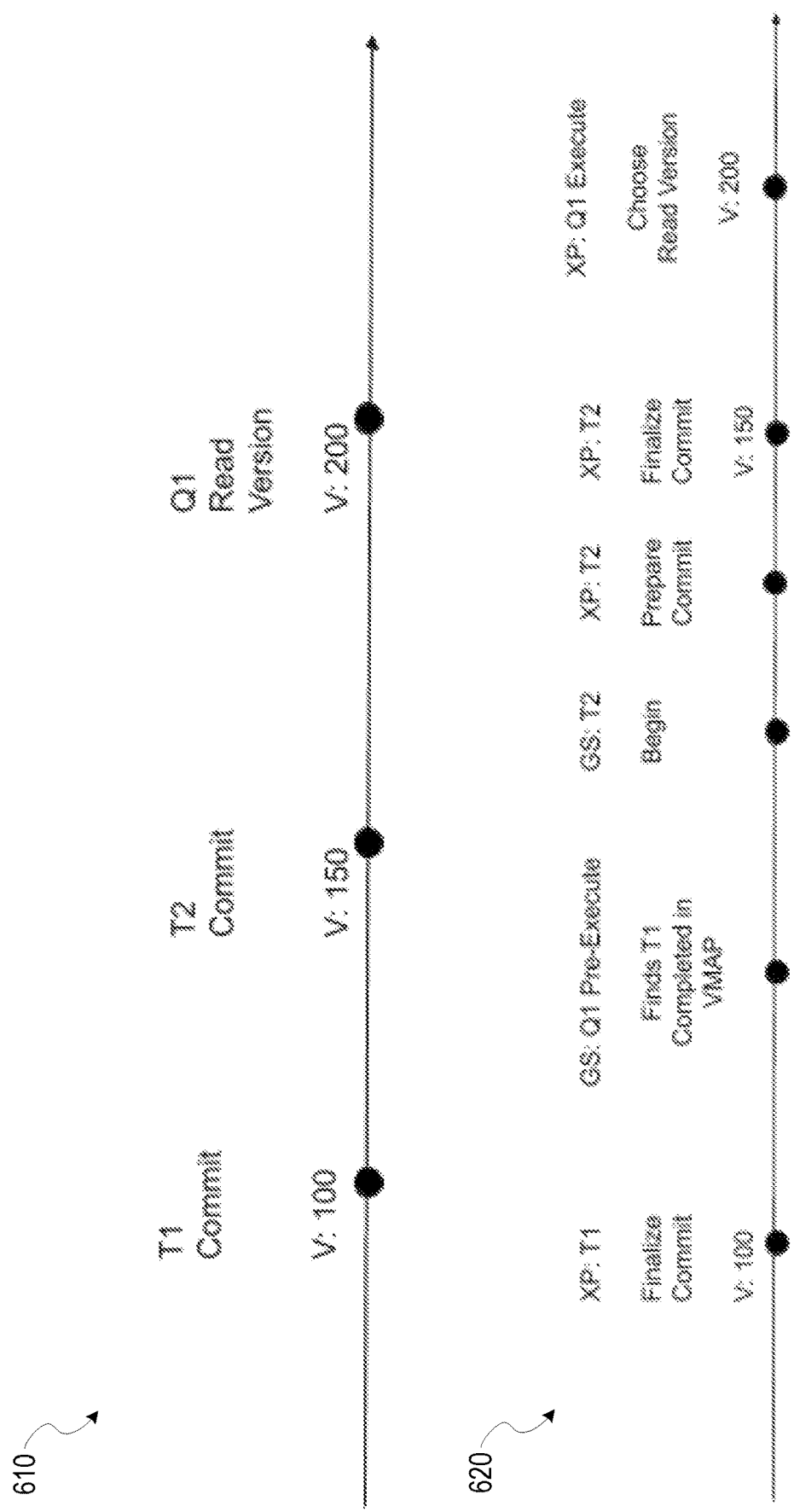
FIG. 6 illustrates examples of a race condition in accordance with at least one embodiment of the subject technology.

FIG. 6 illustrates examples of a race condition in accordance with at least one embodiment of the subject technology.

As shown, timeline 610 includes a set of events T1, T2, and Q1 where T1, T2 are transactions that write to both TFDN and TFKV and Q1 is a query that references the same tables.

Because of the distributed nature of the system architecture, events can be reordered across the compute service manager and execution node as shown in timeline 620.

Timeline 620 illustrates a situation where the execution of the transactions and the query is interleaved in such a way that Q1 witnesses T1 completing and starts execution under the assumption that no other transaction has to be waited for. Instead, between the moment that the query job is dispatched by compute service manager and executed by execution node, T2 starts and ends modifying both FDN and KV tables. As a consequence of this, Q1 uses a read version that allows it to read the T2's changes to TKV but it does not read the changes that T2 has made to TFDN, n.b. T2 may not show up in the VMAP cause it did not even start at the moment in time.

Based on the assumption that this phenomena will happen rarely and that extra latency may be acceptable in the case of cross domain transactions, this can be addressed using the optimistic approach discussed above.

Namely, jobs will be allowed to start but before they terminate execution node will coordinate with compute service manager to verify the quality of the data. If there is a conflict, compute service manager sends a request to the execution node to throw an error and restart. Note that the new version of the micro-partition table cannot be utilized because at that point the partition pruning has already happened.

Figure 7:
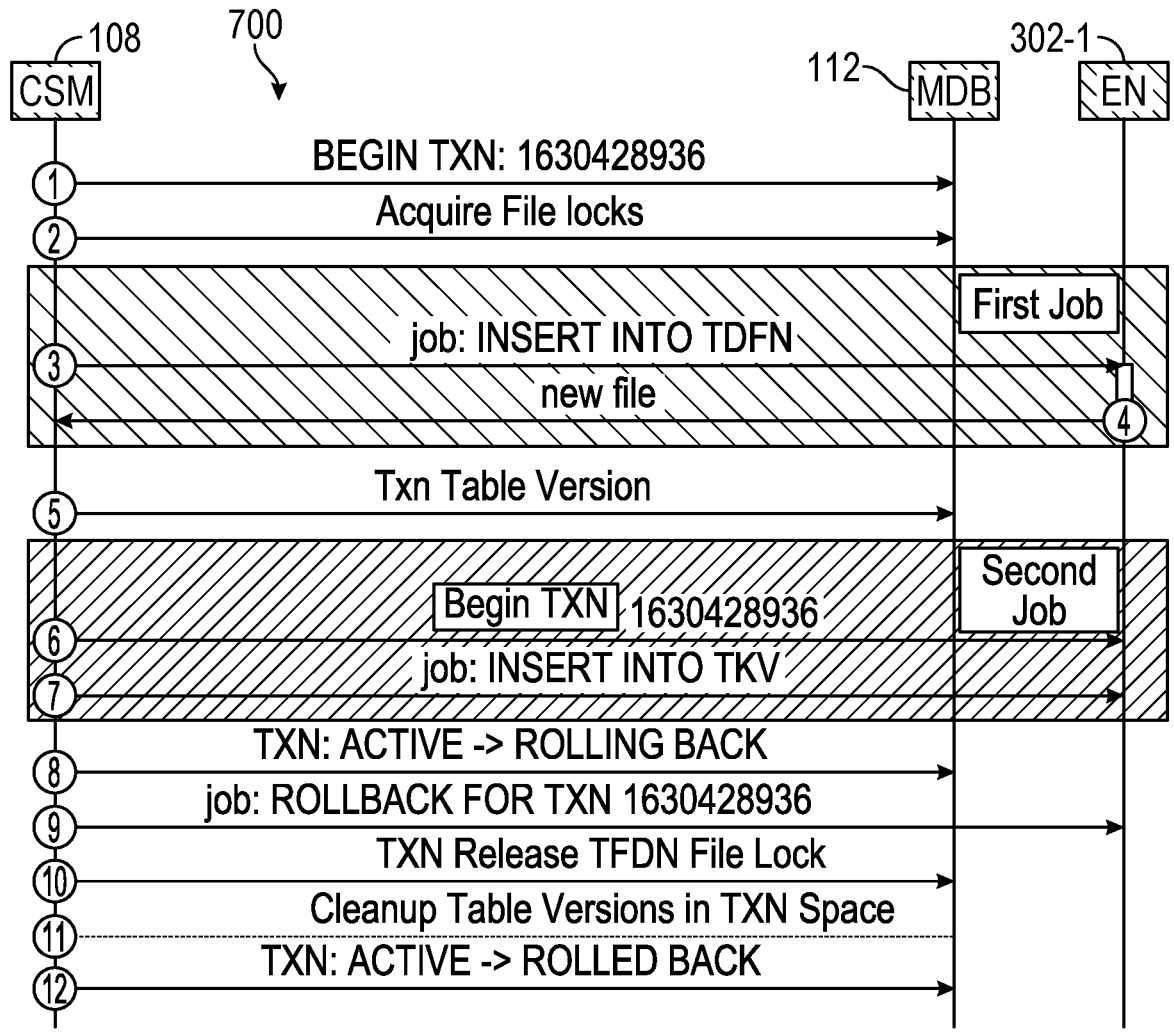
FIG. 7 illustrates an example processing flow for a set of operations of an example rollback of a given cross domain transaction.

FIG. 7 illustrates an example processing flow 700 for a set of operations of an example rollback of a given cross domain transaction. The processing flow 700, in an implementation, can be performed by the compute service manager 108, including transaction manager 440, working in conjunction with a metadata database (metadata database 112) and an execution node (e.g., execution node 302-1).

When an open transaction is rolled back by the client, the process is simple: first the execution node is asked to roll back the transaction and the associated key value table locks are released by the compute service manager, secondly cleanup is run against the change made to the micro-partition tables and the associated locks are released.

At point 1, a transaction, based on a transaction ID, is initialized and bound to the session by computer service manager (e.g., compute service manager 108) sending a request to a metadata database (e.g., metadata database 112). Such a transaction includes multiple statements where at least one statement is performed in a first domain (e.g., involving a micro-partition table) and at least one statement in performed in a second domain (e.g., involving a linearizable storage table).

At point 2, file locks are acquired by the compute service manager which is facilitated by the metadata database (e.g., metadata database 112).

At point 3, a DML statement over a micro-partition table is processed by the compute service manager and sent as a job to an execution node (e.g., execution node 302-1), and the job is executed by the execution node. At point 4, a new file is returned by the execution node to the compute service manager in response to executing the job corresponding to the DML statement.

At point 5, the compute service manager updates a table version in the metadata database.

In points 6 and 7, the DML statement for a linearizable storage table is processed by the compute service manager, which sends a job to the execution node which leverages linearizable storage features described before to make record level changes in the datastore.

At point 8, compute service manager 108 starts a rollback process and moves the transaction to ROLLING BACK state by updating the metadata database.

As point 9, compute service manager 108 sends a job to the execution node to perform the rollback process for the cross domain transaction corresponding to the transaction ID. At point 10, compute service manager 108 release the file lock(s) obtained at point 2.

At point 11, compute service manager 108 performs a cleanup of table versions at the metadata database 112. At point 12, compute service manager 108 updates the state of the transaction to ROLLED BACK on the metadata database 112.

Figure 8:
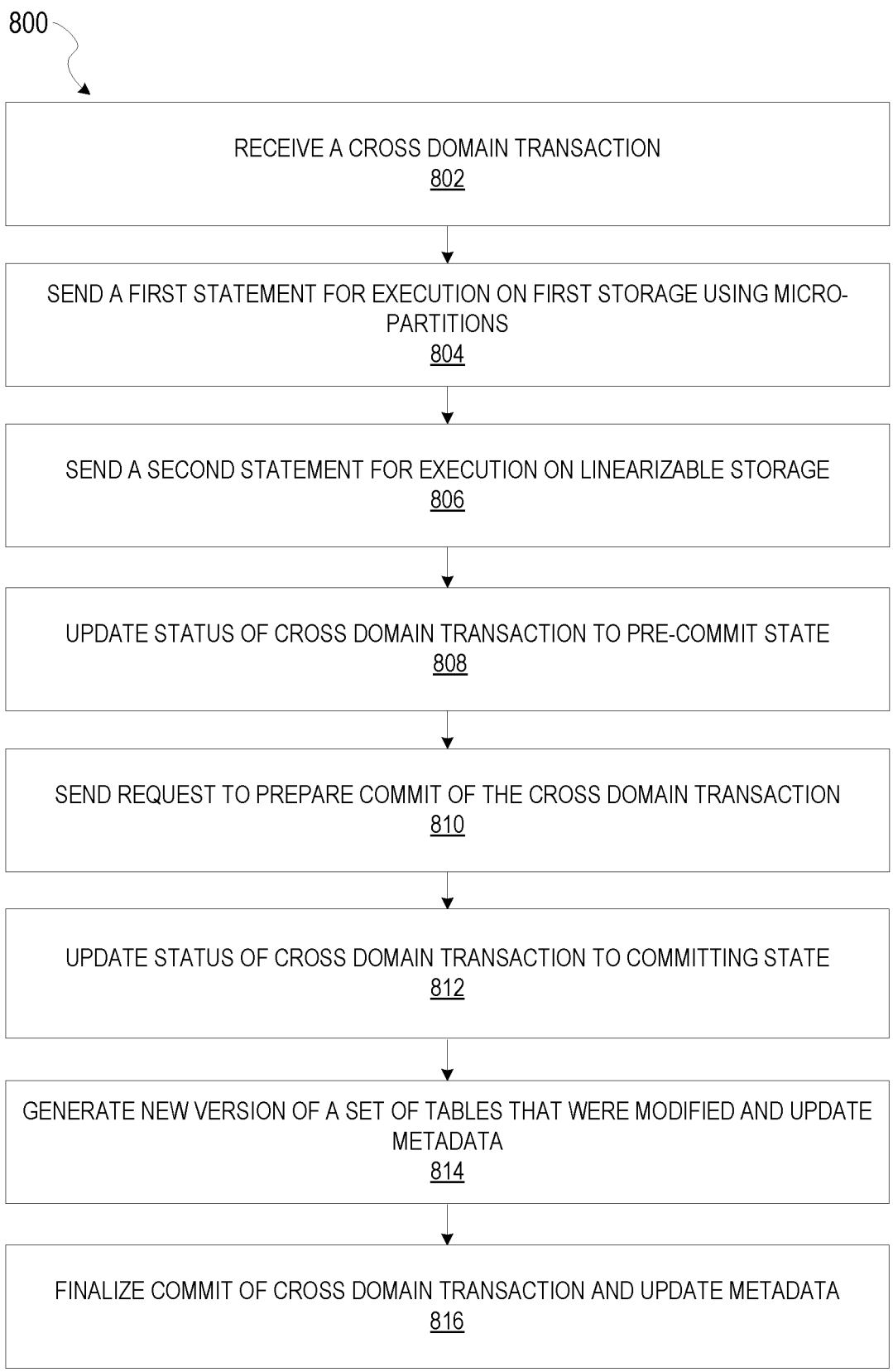
FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102, such as components of the compute service manager 108 or a node in the execution platform 110. Accordingly, the method 800 is described below, by way of example with reference thereto. However, it shall be appreciated that the method 800 may be deployed on various other hardware configurations and is not intended to be limited to deployment within the network-based database system 102.

At operation 802, the compute service manager 108 receives a cross domain transaction, the cross domain transaction including a plurality of statements, the plurality of statements including a first statement for a first operation on a first table including micro-partitions and a second statement for a second operation on a second table provided by linearizable storage, the first table and the second table being different table formats.

At operation 804, the compute service manager 108 sends the first statement to an execution node for executing the first statement on first storage using micro-partitions.

At operation 806, the compute service manager 108 sends the second statement to the execution node for executing the second statement on the linearizable storage.

At operation 808, the compute service manager 108 updates, using a metadata database, a status of the cross domain transaction to a pre-commit state.

At operation 810, the compute service manager 108 sends a request to prepare a commit of the cross domain transaction.

At operation 812, the compute service manager 108 updates, using the metadata database, the status of the cross domain transaction to a committing state.

At operation 814, the compute service manager 108 generates a new version of a set of tables that were modified by the cross domain transaction and updating first metadata in the metadata database to indicate the new version.

At operation 816, the compute service manager 108 finalizes the commit of the cross domain transaction and updating second metadata that the cross domain transaction has been committed.

In an embodiment, the compute service manager 108 acquires a first set of locks for a first set of files and a second set of locks for a second set of files, the first set of locks corresponding to the first table, and the second set of locks corresponding to the second table.

In an embodiment, the first statement for the first operation on the first table comprises a first insert statement, and the second statement for the second operation on the second table comprises a second insert statement.

In an embodiment, the compute service manager 108 receives, from the execution node, a new file after sending the first statement to the execution node for executing the first statement, and updates a table version of the first table in the metadata database, the table version mapping a set of lamport values to a set of files and metadata as a result of executing the first statement.

In an embodiment, the compute service manager 108, after updating the status of the cross domain transaction to status of the cross domain transaction to the pre-commit state, acquires a table lock on the first table.

In an embodiment, the compute service manager 108, after generating the new version of the set of tables, releases the table lock.

In an embodiment, the compute service manager 108, after sending the request to prepare the commit of the cross domain transaction, receives a version stamp, the version stamp including information based at least in part on a time that the second operation was completed.

In an embodiment, the compute service manager 108 updates the first metadata in the metadata database to indicate the new version further comprises including a reference to the version stamp.

In an embodiment, the compute service manager 108 generates a new entry in a version map based at least in part on the version stamp and an indication of a pending status.

Figure 9:
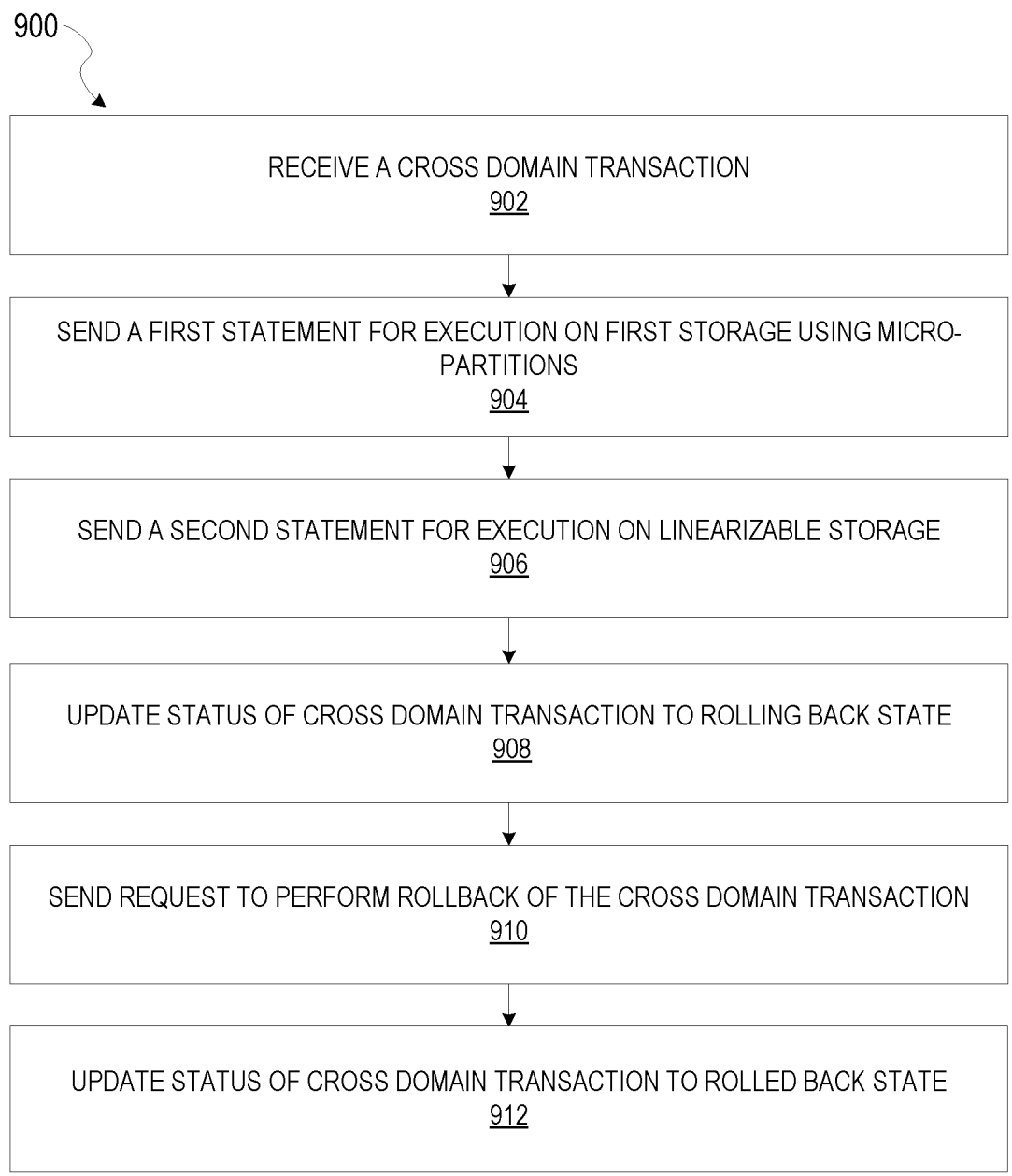
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102, such as components of the compute service manager 108 or a node in the execution platform 110. Accordingly, the method 900 is described below, by way of example with reference thereto. However, it shall be appreciated that the method 900 may be deployed on various other hardware configurations and is not intended to be limited to deployment within the network-based database system 102.

At operation 902, the compute service manager 108 receives a particular cross domain transaction, the particular cross domain transaction including a particular plurality of statements.

At operation 904, the compute service manager 108 sends a first particular statement to the execution node for executing the first particular statement on first storage using micro-partitions.

At operation 906, the compute service manager 108 sends a second particular statement to the execution node for executing the second particular statement on the linearizable storage.

At operation 908, the compute service manager 108 updates, using the metadata database, a particular status of the particular cross domain transaction to a rolling back state.

At operation 910, the compute service manager 108 sends a particular request to the execution to perform a rollback of the particular cross domain transaction.

At operation 912, the compute service manager 108 updates, using the metadata database, the particular status of the particular cross domain transaction to a rolled back state.

Figure 10:
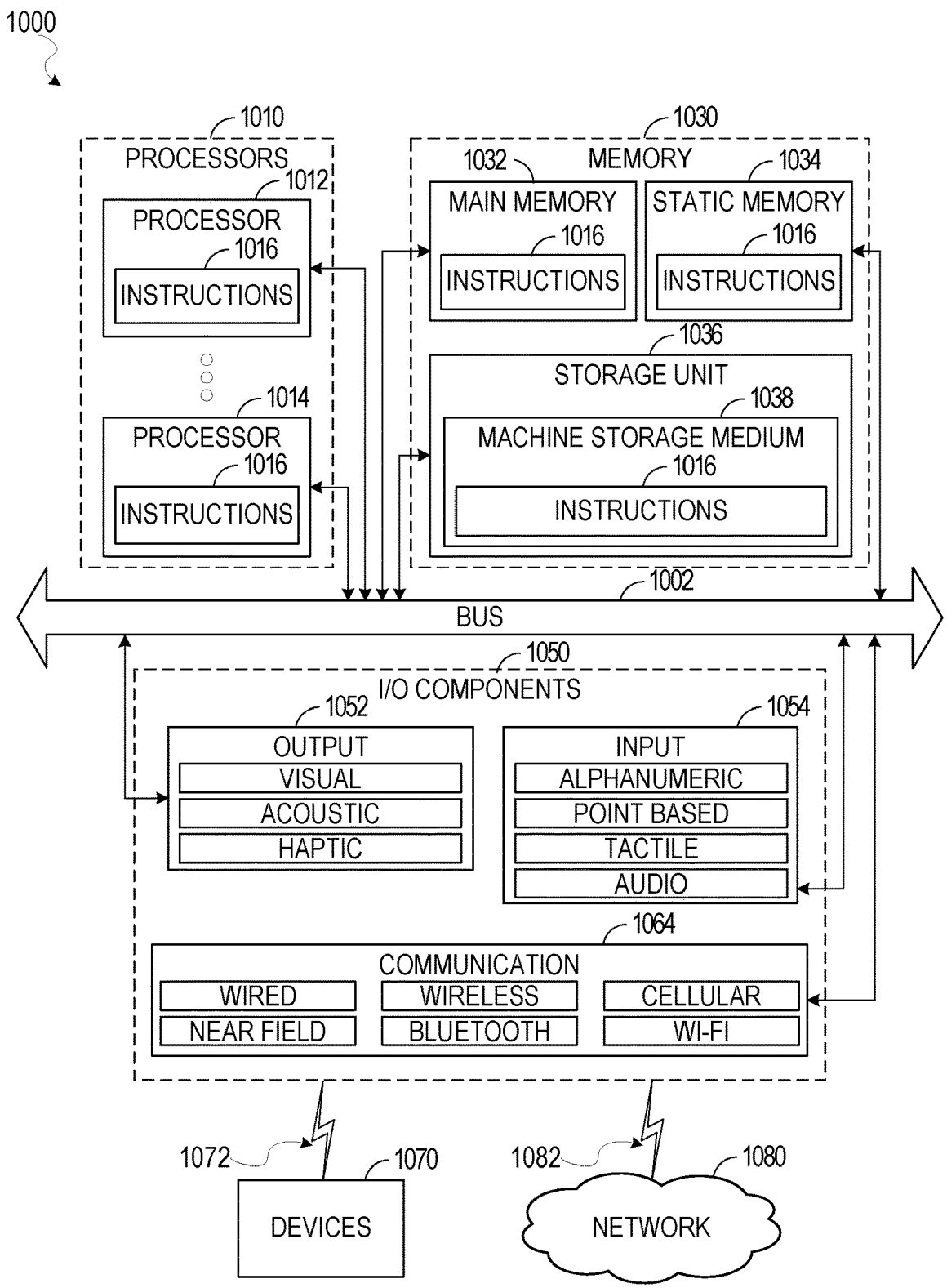
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of the methods described above. As another example, the instructions 1016 may cause the machine 1000 to implement portions of the data flows illustrated in at least FIG. 5 or FIG. 7. In this way, the instructions 1016 transform a general, non-programmed machine into a particular machine 1000 (e.g., the compute service manager 108 or a node in the execution platform 110) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within machine storage medium 1038 of the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the compute service manager 108 or the execution platform 110, and the devices 1070 may include the client device 114 or any other computing device described herein as being in communication with the network-based database system 102 or the cloud storage platform 104-1.

Executable Instructions and Machine Storage Medium

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    a memory storing instructions that cause the at least one hardware processor to perform operations comprising:
        receiving a transaction, the transaction including a first statement, a second statement, and a transaction identifier associated with the transaction;
        after receiving the transaction, acquiring, by using a metadata database, a set of file locks;
        after acquiring the set of file locks, sending the first statement to an execution node for executing the first statement on first storage using micro-partitions, the first statement comprising a first write operation to at least one micro-partition;
        sending the second statement to the execution node for executing the second statement on linearizable storage, the second statement comprising a second write operation to the linearizable storage, the second statement being associated with the transaction identifier;
        sending a request to prepare a commit of a cross domain transaction associated with the first statement and the second statement;
        generating a new version of a set of tables that were modified by the cross domain transaction and updating first metadata in the metadata database to indicate the new version;
        generating, after sending the request to prepare the commit of the cross domain transaction, a new entry in a version map, the new entry comprising a table name, a particular version at which the commit was prepared, and an indication of a pending status, the indication of the pending status comprising a value, the value being set to pending;
        finalizing the commit of the cross domain transaction; and
        after finalizing the commit of the cross domain transaction, generating a second new entry in the version map, the second new entry comprising the table name, the particular version at which the commit was prepared, and a second particular version at which the commit was finalized by the execution node providing access to the linearizable storage.

2. The system of claim 1, wherein the operations further comprise:
    prior to acquiring a table lock, updating, using the metadata database, a status of the cross domain transaction to a pre-commit state; and
    after acquiring the table lock, updating, using the metadata database, the status of the cross domain transaction to a committing state.

3. The system of claim 2, wherein acquiring, by using the metadata database, the set of file locks comprises sending a particular request to the metadata database to acquire the set of file locks, and the operations further comprise:
    after updating the status of the cross domain transaction to the pre-commit state, acquiring the table lock on a first table by updating the metadata database; and
    after generating the new version of the set of tables, releasing the table lock at the metadata database.

4. The system of claim 3, wherein the first statement includes a first operation on the first table including micro-partitions, and the second statement includes a second operation on a second table provided by linearizable storage, the first table and the second table being different table formats.

5. The system of claim 4, wherein the operations further comprise:
    after sending the request to prepare the commit of the cross domain transaction, receiving the version stamp, the version stamp including information based at least in part on a time that the second operation was completed.

6. The system of claim 5, wherein updating the first metadata in the metadata database to indicate the new version further comprises including a reference to the version stamp.

7. The system of claim 1, wherein the operations further comprise:
    receiving a particular cross domain transaction, the particular cross domain transaction including a particular plurality of statements;
    sending a first particular statement to the execution node for executing the first particular statement on the first storage using micro-partitions;
    sending a second particular statement to the execution node for executing the second particular statement on the linearizable storage;
    updating, using the metadata database, a particular status of the particular cross domain transaction to a rolling back state;
    sending a particular request to the execution to perform a rollback of the particular cross domain transaction; and
    updating, using the metadata database, the particular status of the particular cross domain transaction to a rolled back state.

8. The system of claim 1, wherein the operations further comprise:
    acquiring a first set of locks for a first set of files and a second set of locks for a second set of files, the first set of locks corresponding to a first table, and the second set of locks corresponding to a second table.

9. The system of claim 1, wherein the operations further comprise:
    receiving, from the execution node, a new file after sending the first statement to the execution node for executing the first statement; and
    updating a table version of a first table in the metadata database, the table version mapping a set of lamport values to a set of files and metadata as a result of executing the first statement.

10. A method comprising:
    receiving a transaction, the transaction including a first statement, a second statement, and a transaction identifier associated with the transaction;
    after receiving the transaction, acquiring, by using a metadata database, a set of file locks;
    after acquiring the set of file locks, sending the first statement to an execution node for executing the first statement on first storage using micro-partitions, the first statement comprising a first write operation to at least one micro-partition;
    sending the second statement to the execution node for executing the second statement on linearizable storage, the second statement comprising a second write operation to the linearizable storage, the second statement being associated with the transaction identifier;
    sending a request to prepare a commit of a cross domain transaction associated with the first statement and the second statement;
    generating, after sending the request to prepare the commit of the cross domain transaction, a new version of a set of tables that were modified by the cross domain transaction and updating first metadata in a metadata database to indicate the new version;
    generating a new entry in a version map, the new entry comprising a table name, a particular version at which the commit was prepared, and an indication of a pending status, the indication of the pending status comprising a value, the value being set to pending;
    finalizing the commit of the cross domain transaction; and
    after finalizing the commit of the cross domain transaction, generating a second new entry in the version map, the second new entry comprising the table name, the particular version at which the commit was prepared, and a second particular version at which the commit was finalized by the execution node providing access to the linearizable storage.

11. The method of claim 10, further comprising:
    prior to acquiring a table lock, updating, using the metadata database, a status of the cross domain transaction to a pre-commit state; and
    after acquiring the table lock, updating, using the metadata database, the status of the cross domain transaction to a committing state.

12. The method of claim 11, further comprising:
    after updating the status of the cross domain transaction to the pre-commit state, acquiring the table lock on a first table; and
    after generating the new version of the set of tables, releasing the table lock.

13. The method of claim 12, wherein the first statement includes a first operation on the first table including micro-partitions, and the second statement includes a second operation on a second table provided by linearizable storage, the first table and the second table being different table formats.

14. The method of claim 13, further comprising:
    after sending the request to prepare the commit of the cross domain transaction, receiving the version stamp, the version stamp including information based at least in part on a time that the second operation was completed.

15. The method of claim 14, wherein updating the first metadata in the metadata database to indicate the new version further comprises including a reference to the version stamp.

16. The method of claim 10, further comprising:
    receiving a particular cross domain transaction, the particular cross domain transaction including a particular plurality of statements;
    sending a first particular statement to the execution node for executing the first particular statement on the first storage using micro-partitions;

sending a second particular statement to the execution node for executing the second particular statement on the linearizable storage;
updating, using the metadata database, a particular status of the particular cross domain transaction to a rolling back state;
sending a particular request to the execution to perform a rollback of the particular cross domain transaction; and
updating, using the metadata database, the particular status of the particular cross domain transaction to a rolled back state.

17. The method of claim 10, further comprising:
acquiring a first set of locks for a first set of files and a second set of locks for a second set of files, the first set of locks corresponding to a first table, and the second set of locks corresponding to a second table.

18. The method of claim 10, further comprising:
receiving, from the execution node, a new file after sending the first statement to the execution node for executing the first statement; and
updating a table version of a first table in the metadata database, the table version mapping a set of lamport values to a set of files and metadata as a result of executing the first statement.

19. A non-transitory computer-storage medium comprising instructions that, when executed by one or more processors of a machine, configure the machine to perform operations comprising:
receiving a transaction, the transaction including a first statement, a second statement, and a transaction identifier associated with the transaction;
after receiving the transaction, acquiring, by using a metadata database, a set of file locks;
after acquiring the set of file locks, sending the first statement to an execution node for executing the first statement on first storage using micro-partitions, the first statement comprising a first write operation to at least one micro-partition;
sending the second statement to the execution node for executing the second statement on linearizable storage, the second statement comprising a second write operation to the linearizable storage, the second statement being associated with the transaction identifier;
sending a request to prepare a commit of a cross domain transaction associated with the first statement and the second statement;
generating a new version of a set of tables that were modified by the cross domain transaction and updating first metadata in a metadata database to indicate the new version;
generating, after sending the request to prepare the commit of the cross domain transaction, a new entry in a version map, the new entry comprising a table name, a particular version at which the commit was prepared, and an indication of a pending status, the indication of the pending status comprising a value, the value being set to pending;
finalizing the commit of the cross domain transaction; and
after finalizing the commit of the cross domain transaction, generating a second new entry in the version map, the second new entry comprising the table name, the particular version at which the commit was prepared, and a second particular version at which the commit was finalized by the execution node providing access to the linearizable storage.

20. The non-transitory computer-storage medium of claim 19, wherein the operations further comprise:
prior to acquiring a table lock, updating, using the metadata database, a status of the cross domain transaction to a pre-commit state; and
after acquiring the table lock, updating, using the metadata database, the status of the cross domain transaction to a committing state.

21. The non-transitory computer-storage medium of claim 20, wherein the operations further comprise:
after updating the status of the cross domain transaction to the pre-commit state, acquiring the table lock on a first table; and
after generating the new version of the set of tables, releasing the table lock.

22. The non-transitory computer-storage medium of claim 21, wherein the first statement includes a first operation on the first table including micro-partitions, and the second statement includes a second operation on a second table provided by linearizable storage, the first table and the second table being different table formats.

23. The non-transitory computer-storage medium of claim 22, wherein the operations further comprise:
after sending the request to prepare the commit of the cross domain transaction, receiving the version stamp, the version stamp including information based at least in part on a time that the second operation was completed.

24. The non-transitory computer-storage medium of claim 23, wherein updating the first metadata in the metadata database to indicate the new version further comprises including a reference to the version stamp.

25. The non-transitory computer-storage medium of claim 19, wherein the operations further comprise:
receiving a particular cross domain transaction, the particular cross domain transaction including a particular plurality of statements;
sending a first particular statement to the execution node for executing the first particular statement on the first storage using micro-partitions;
sending a second particular statement to the execution node for executing the second particular statement on the linearizable storage;
updating, using the metadata database, a particular status of the particular cross domain transaction to a rolling back state;
sending a particular request to the execution to perform a rollback of the particular cross domain transaction; and
updating, using the metadata database, the particular status of the particular cross domain transaction to a rolled back state.

26. The non-transitory computer-storage medium of claim 19, wherein the operations further comprise:
acquiring a first set of locks for a first set of files and a second set of locks for a second set of files, the first set of locks corresponding to a first table, and the second set of locks corresponding to a second table.

27. The non-transitory computer-storage medium of claim 19, wherein the operations further comprise:
receiving, from the execution node, a new file after sending the first statement to the execution node for executing the first statement; and
updating a table version of a first table in the metadata database, the table version mapping a set of lamport values to a set of files and metadata as a result of executing the first statement.

* * * * *